United States Patent Office 3,541,185
Patented Nov. 17, 1970

3,541,185
CHLORINATED POLYVINYL CHLORIDE RESIN
COMPOSITION FOR MOLDING
Susumu Taima, Uozu-shi, and Saiji Nozaki, Unazuki-machi, Japan, assignors to Nippon Carbide Kogyo Kabushiki Kaisha, Tokyo, Japan, a corporation of Japan
Filed Dec. 27, 1967, Ser. No. 693,952
Claims priority, application Japan, Nov. 16, 1967, 42/73,332
Int. Cl. C08f 29/22
U.S. Cl. 260—876  4 Claims

ABSTRACT OF THE DISCLOSURE

Chlorinated polyvinyl chloride resin composition for molding the processability of which for molding is remarkably improved and the heat stability and impact resistance of which are additionally improved without substantially lowering an improved softening point inherently possessed by chlorinated polyvinyl chloride per se, and said composition consisting of the following (A) 100 parts by weight of a specific chlorinated polyvinyl chloride,
(B) a methyl methacrylate-butadiene-styrene copolymer,
(C) 1–7 parts of a specific ethylene-vinyl acetate copolymer, and
(D) known additives for a composition for molding, characterized in that the total of said (B) and (C) is 3–20 parts by weight, and 20–80% by weight of the total of said (B) and (C) is occupied by said (B) copolymer.

---

Figure 1:
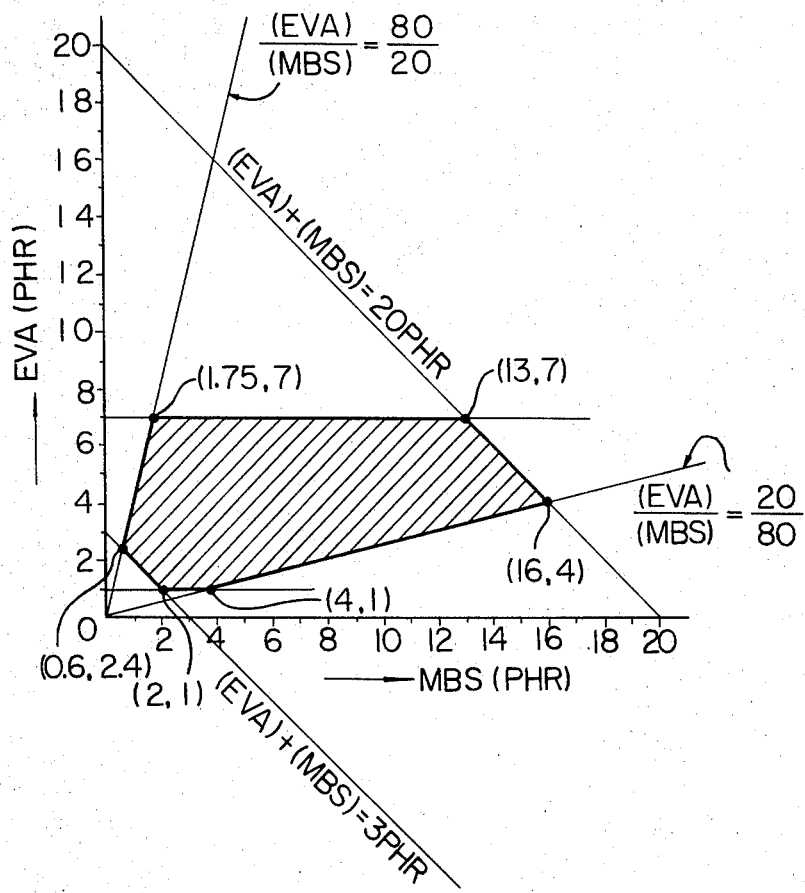

The present invention relates to chlorinated polyvinyl chloride resin compositions for molding whose processability for molding is remarkably improved and the heat stability and impact resistance of which are additionally improved without substantially lowering an improved softening point inherently possessed by chlorinated polyvinyl chloride per se.

More particularly, the present invention relates to chlorinated polyvinyl chloride composition for molding, said compositions consisting of (A) 100 parts by weight of chlorinated polyvinyl chloride (hereinafter referred to as Cl-PVC) the chlorine content of which is above 63% by weight, preferably 65–70% by weight,
(B) a copolymer of methyl methacrylate, butadiene and styrene (hereinafter referred to as MBS),
(C) 1–7 parts by weight, preferably 2–6 parts by weight of an ethylene-vinyl acetate copolymer (hereinafter referred to as EVA) the vinyl acetate content of which is 20–50% by weight, preferably 25–45% by weight, and
(D) known additives for a molding composition, total of said (B) and (C) being 3–20 parts by weight, preferably 4–15 parts by weight, and 20–80% by weight, preferably 25–75% by weight of the total amount of said (B) and (C) is occupied by the copolymer (B).

As has been known heretofore, polyvinyl chloride (hereinafter referred to as PVC) is excellent in various properties such as chemical resistance, flame resistance and processability; on the other hand, because it brings about thermal deformation at a relatively low temperature, an industrial utilization of PVC has been greatly restricted. For improving this deficiency, a technology of post-chlorinating PVC to make it Cl-PVC was developed and many proposals have been made. However, as its chlorine content increases this Cl-PVC is improved in softening temperature; on the other hand, in order to shape Cl-PVC, PVC must inevitably be exposed to a higher temperature and because the melt viscosity of Cl-PVC is higher than that of PVC, heat generation at the time of processing for molding becomes extreme. Under such strict conditions inevitably encountered upon molding Cl-PVC, Cl-PVC undergoes thermal decomposition and it becomes difficult to obtain a molded article having satisfactory appearance and physical properties.

Also inferiority of thermal fluidity of Cl-PVC is not only related to thermal decomposition at the sime of processing for molding as mentioned above, but very grave shortcomings also result as follows. For example, when injection molding is carried out, many of the molded articles obtained are incomplete in filling; further in cross section of such a molded article a few clear layers are recognized. Said layers are derived from two characters of a high softening temperature and inferior processability for molding of Cl-PVC, and in case a molded article is, for instance, a joint for a pipe, due to permeation of an organic solvent of an adhesive used at the time of practicing plumbing or a mechanical impact applied to said joint, delamination is expedited, becoming reason for leakage of a fluid during plumbing. In case the molding process is an extrusion molding and especially in case a molded article is a pipe also, a clear spider mark of the die is recognized in the pipe. Such a pipe results in a very undesirable result that the part of said spider mark is easily broken by a mechanical impact applied to the pipe. The bad effect is remarkable especially in the former injection molded article.

On top of that, Cl-PVC is unavoidably accompanied by a new deficiency in that its impact resistance lowers.

Accordingly, unless these new problems are solved, it is difficult to utilize Cl-PVC as a molding material.

In order to solve these new problems, it has been proposed to blend with Cl-PVC a high molecular weight processing assistant, for instance the process of Japanese patent application publication No. 1327/1967 of blending an acrylonitrile-butadiene-styrene copolymer (hereinafter may be referred to as ABS), the process of French Pat. 1,405,362 of blending EVA or the process of Japanese patent application publication No. 1217/1963 of blending chlorinated polyethylene (hereinafter may be referred to as Cl-PE) may be cited.

It is true that by blending the high molecular weight processing assistants of these proposals, the impact resistance can be increased to a practical level; however an object of improving the heat stability by advancing the heat fluidity is not necessarily satisfied, and even if the heat fluidity is improved, in many cases further new deficiencies are accompanied. Namely, in the case of ABS or Cl-PE in a blending amount wherein improvement of the impact resistance is recognized, the heat fluidity is not improved, but increase in the thermal decomposition is expedited on the contrary. Furthermore, in the case of Cl-PE lowering of the softening temperature of Cl-PVC is remarkable, that is, the most preferable important physical property inherently possessed by Cl-PVC is damaged. On the other hand, in the case of EVA in a blending amount wherein improvement of the impact resistance is recognized; improvement of the heat fluidity is recognized, however, no improvement is recognized at all in the aforementioned delamination which is a very important character especially in case of an injection molded article. This fact means that by merely advancing the heat fluidity it is impossible to improve this grave deficiency.

As a result of studying in an effort to solve these fatal technical problems (especially delamination) accompanying Cl-PVC as a molding material, the present inventors have found that said problems are remarkably improved by a composition wherein Cl-PVC is blended with MBS and EVA in amounts within specific ranges.

The degree of improvement of delamination of said composition is very remarkable as will be apparent from examples to be illustrated later and no delamination is recognized in a benzene immersion test. The heat fluidity is also remarkably improved, and it is apparent that Cl-PVC having a softening temperature higher than that of PVC exhibits a heat fluidity same as that of PVC. Coupled with improvement of the delamination, this is an improvement which is industrially remarkably advantageous. Further, with respect to the impact resistance, it is improved to a value larger than that of the non-chlorinated original PVC; moreover, it has become apparent that rise of the softening temperature improved by chlorination is substantially not lowered in the composition of the present invention.

Accordingly, an object of the present invention, especially improvement of the delamination of a molded article is achieved by simultaneously meeting the following various requirements. Namely, it is necessary that (1) with 100 parts by weight of Cl-PVC whose chlorine content is above 63% by weight, are mixed
(2) 3–20 parts by weight of a mixture of copolymers of MBS and EVA,
(3) moreover, the ratio of the MBS component in the mixture of copolymers is 20–80% by weight,
(4) further, the vinyl acetate content of said EVA is 20–50% by weight,
(5) and the EVA component is 1–7 parts by weight.

Delamination of a joint obtained from the Cl-PVC composition of the present invention by, for instance, injection molding is none after 24 hours in a benzene immersion test to be described hereinafter. In contrast thereto a molded article obtained from a composition not meeting the requirements of the present invention has, even if its delamination is best, clear delamination within only a few hours, being the same qualitatively entirely unsatisfactory.

(1) As the Cl-PVC that which has a chlorine content of above 63% by weight, preferably 65–70% is used; however, as the Cl-PVC utilized in the present invention, a chlorinated homopolymer of vinyl chloride is especially preferable. Cl-PVC obtained by chlorinating PVC containing other known copolymerizing monomer components, for instance, vinyl acetate, vinylidene chloride, alkyl acrylate, alkyl methacrylate and maleic acid ester are also utilizable; however, in such case the ratio of the further copolymerizable monomer component should be a small amount of not more than 5% by weight. A PVC containing the copolymerizable monomer component in an amount above such amount is unsuitable as a material for Cl-PVC used in the composition of the present invention having a high softening temperature. Accordingly, the Cl-PVC utilized in the present invention is a Cl-PVC obtained by chlorinating a PVC containing a copolymerizable monomer component in an amount not exceeding 5% by weight.

Cl-PVC whose chlorine content is below 63% by weight, especially below 60% by weight, even if used in the composition of the present invention does not become a composition from which a molded article having a satisfactorily high softening temperature can be obtained. Accordingly, in the present invention Cl-PVC whose chlorine content is above 60% by weight, especially above 63% by weight should be selected. An especially remarkable effect is obtained when Cl-PVC whose chlorine content is 65–70% by weight, is used.

(2) A mixture of copolymers of MBS and EVA is used in an amount of 3–20 parts by weight, preferably 4–15 parts by weight based on 100 parts by weight of Cl-PVC. When the total blending amount is below 3 parts by weight, sufficient improvement of the heat fluidity is not obtained, and when the total blending amount is above 20 parts by weight, sufficient improvement of the delamination cannot be obtained. At the same time, such higher amount brings about substantial lowering of the softening temperature.

With respect to the MBS blended with Cl-PVC, there is no particular restriction. In order to achieve the object of the present invention, however, a copolymer obtained by graft polymerization of 100 parts by weight of a butadiene-styrene copolymer containing above 50% by weight of butadiene as a main component with 50–200 parts by weight of a mixture of methyl methacrylate and styrene monomer containing 30–80% by weight of methyl methacrylate as a branch component is especially preferred.

(3) The ratio of MBS in a mixture of copolymers of MBS and EVA is 20–80% by weight, preferably 25–75% by weight. When said ratio is below 20% by weight, for instance, below 15% by weight, sufficient improvement of delamination is not obtained and when said ratio is above 75% by weight, for instance, above 85% by weight, danger of thermal decomposition is brought about and a good molded article cannot be obtained.

(4) The vinyl acetate content of the EVA component is 20–50% by weight, preferably 25–45% by weight. When it is below 20% by weight, sufficient improvement of the delamination is not obtained, and when it is above 50% by weight, sufficient improvement of the heat fluidity cannot be obtained. In the flow character of EVA used per se, there is no particular restriction; however, EVA of a high molecular weight of a melt index of 2–200 is used ordinarily.

(5) The EVA component is used in an amount of 1–7 parts by weight, preferably 2–6 parts by weight. When the amount is below 1 part by weight, sufficient improvement of the heat fluidity is not obtained, and when the amount is above 7 parts by weight, sufficient improvement of the delamination is not achieved.

The blending ranges of the (B) and (C) components based on Cl-PVC in the present invention may be shown as a part of oblique lines in FIG. 1. Namely, the abscissa shows the blending amount of the (B) component (MBS) to be blended with 100 parts by weight of Cl-PVC, while the ordinate shows the blending amount of the (C) component (EVA). Accordingly, the blending ranges of the (B) and (C) components in the present invention are shown as within the figure connecting co-ordinates (0.6, 2.4), (1.75, 7), (13, 7), (16, 4), (4, 1) and (2, 1).

It goes without saying that in the composition of the present invention known additives normally used for a composition for molding, for instance, heat stabilizer, light resisting agent, filler, coloring agent, lubricant, mold releasing agent and antioxidant in proper amounts may be blended by usual manner.

As said additives, for instance, tribasic lead sulfate, dibasic lead stearate, metal soap, dibutyl tin maleate, butyl stearate and paraffin wax may be cited.

Upon blending all proper mixing means usually used for blending of such resin composition for molding may be used and as to the sequence of blending, there is no particular limit. Upon mixing, apparatuses such as, for instance, mixing roll, Banbury's mixer, ribbon blender and Henschel mixer may be utilized.

Next, the present invention will be explained in detail with reference to examples; however, the present invention will not be limited by these examples.

Conditions for preparing test pieces and test methods used in the present invention are as follows.

(1) Conditions for preparing each test piece for measuring.

1-1 Conditions for injection molding: Injection molding machine, manufactured by Meiki Seisakusko, inline single screw-type.
  Screw:
    Diameter: 30 mm.
    L/D: 22
    Compression ratio: 1.6

Injection amount: 3.5 oz.
Mold tightening pressure: 7,500 kg.
Conditions for injection molding:
  Barrel temperature:
    180° C. (Zone I)
    190° C. (Zone II)
    190° C. (Zone III)
  Metal mold temperature: 80° C.
  Injection pressure: 1,550 kg./cm.$^2$
  Injection speed: 30 cm.$^2$/sec.
  R.p.m. of screw: 60 r./m.
    Molded article:
      1¼" elbow
1-2 Test piece for measuring thermal decomposition: The elbow molded in 1-1, above per se is made a test piece.
1-3 Test piece for measuring delamination: From the elbow molded in 1-1, above a 2 cm.-long cylinder is cut, which is made a test piece.
1-4 Test piece for measuring softening temperature: The elbow molded in 1-1, above is cut to 100 mm. wide and 15 mm. long and finished with 2 mm. thickness is made a test piece.
1-5 Test piece for measuring impact strength: The elbow molded in 1-1, above is cut to a predetermined size, which is pressed by a hot press at 190° C. under a pressure of 50 kg./cm$^2$ for 10 minutes and a 2 mm. thick pressed plate is made. Said pressed plate is cut to 10 mm. wide, 15 mm. long and 2 mm. thick. Further the resultant cut piece is cut in a direction of length at a place 5.5 mm. from one end to provide a V notch of a angle of 45° and a depth of 0.6 mm., and the resultant notched piece is made a test piece.
(2) Condition for and method of measuring:
2-1 Thermal decomposition: Injection molding is repeatedly carried out under conditions of 1-1, above and it is indicated by number of molded articles obtained by molding until about 30% of the entire surface area is colored or has a trace of foaming observed by naked eyes. (Once a shaped article colored or having a trace of foaming is molded, unless the operation is suspended for a while, molten resin is removed and molding is carried out anew, coloration or formation of a trace of foaming becomes more excessive and the molding operation per se becomes impossible.)
2-2 Delamination: A test piece is immersed in benzene at 25° C., it is taken out every 30 minutes within 3 hours, every 1 hour after 3 hours and observed by naked eyes, and it is indicated by time until clear delamination is observed on cross section of the test piece.
2-3 Heat fluidity: In 1-1, above injection molding is carried out under exactly the same conditions except the metal mold for a molded article used in 1-1 is replaced by metal mold having a semicircular helical flow passage graduated with length is used, and it is indicated by length (cm.) of a helical molded article filled in said metal mold.
2-4 Softening temperature: JIS (Japan Industrial Standard) K 6742 is carried out except temperature of a metal stand at the time of measuring is started is made 90° C., and the temperature (expressed in ° C.) is measured.
2-5 Impact strength:
  (1) Measuring machine Dynstat tester manufactured by Kark Frank GmbH
  (2) Measuring conditions:
    Length of a pendulum: 25 cm.
    Swinging up angle: 60°
    Striking energy: 5 kg. cm.
    Striking distance: 7 mm.
    Measured temperature: 25° C.
  (3) Measured value:
    A numerical value obtained by an energy required for breaking the test piece obtained by said measuring conditions divided by an area corresponding to the remaining thickness of the notch (indicated by kg. cm./cm.$^2$) is made of a measured value.
(3) Blending prescription:

Cl-PVC: 100 parts by weight (Cl percent: 65, 67 and 69)
Tribasic lead sulfate : 2 parts by wt.
Dibasic lead stearate : 2 parts by wt.
Barium stearate: 1 part by wt.
Higher alcohol : 1 part by wt.
Organic tin stabilizer : 3 parts by wt.
High molecular weight processing assistant: Necessary amount Hereinbelow a few examples of process for preparing MBS used in examples will be shown as Reference Examples.

REFERENCE EXAMPLE A

To a latex containing 100 parts by weight of a butadienestyrene emulsion polymer whose butadiene component was 75% by weight and whose styrene component was 25% by weight, 100 parts by weight of a monomer mixture of 37% by weight of styrene monomer and 63% by weight of methyl methacrylate monomer were added in the presence of a known water-soluble emulsion polymerization initiator and a known water-soluble emulsifier. The mixture was emulsion graft copolymerized and the obtained latex was salted out with a known salting out agent, washed with water and dried to obtain an MBS copolymer.

REFERENCE EXAMPLE B

Reference Example A was repeated except ratio of butadiene and styrene of the butadiene-styrene emulsion copolymer was 60% by weight and 40% by weight, respectively, and the component ratio of the respective monomer of styrene and methyl methacrylate to be graft emulsion copolymerized was 70% by weight and 30% by weight, respectively.

REFERENCE EXAMPLE C

Reference Example A was repeated except that the ratio of the respective monomer components of the butadiene-styrene emulsion copolymer was 80% by weight and 20% by weight, and the component ratio of styrene and methyl methacrylate to be graft emulsion copolymerized was 30% by weight and 70% by weight, respectively.

EXAMPLE 1

A mixture of 100 parts by weight of Cl-PVC whose chlorine content was 67% by weight, 5 parts by weight of MBS (the graft copolymer of said Reference Example A), 5 parts by weight of EVA (copolymer whose vinyl acetate content was 33% by weight) and the aforementioned blending prescription was molded by the aforementioned injection conditions and test results obtained by the aforementioned test method are shown in Table 1.

In Table 1 results obtained by testing the comparative compositions are concurrently described in order to clearly show the superior character of the composition of the present invention.

COMPARATIVE EXAMPLES 1–3

Example 1 was repeated except using the following high molecular weight processing assistant in place of the mixture of copolymers of MBS and EVA of Example 1.

COMPARATIVE EXAMPLES 1 and 1'

Five and 10 parts of ABS (a graft copolymer whose ratio of each monomer component was 15% by weight of acrylonitrile, 65% by weight of butadiene and 20% by weight of styrene).

COMPARATIVE EXAMPLES 2 and 2'

Five and 10 parts of EVA (the graft copolymer exactly same as that of Example 1).

COMPARATIVE EXAMPLE 3

Mixture of copolymers of 5 parts by weight of ABS (the graft copolymer exactly same as that of Control 1) and 5 parts by weight of EVA (the graft copolymer exactly same as that of Example 1).

TABLE 1

| | Cl-PVA (parts by weight) | MBS (or ABS) (parts by weight) | EVA (parts by weight) | Delamination (hr.) | Thermal decomposition (number) | Heat fluidity (cm.) |
|---|---|---|---|---|---|---|
| Example 1 | 100 | MBS 5 | 5 | Above 24 | Above 200 | 43 |
| Comparative Example 1 | 100 | ABS 5 | | Above 24 | 14 | 31 |
| Comparative Example 1' | 100 | ABS 10 | | Above 24 | 3 | 27 |
| Comparative Example 2 | 100 | | 5 | 3 | Above 200 | 41 |
| Comparative Example 2' | 100 | | 10 | 0.5 | Above 200 | 53 |
| Comparative Example 3 | 100 | ABS 5 | 5 | Above 24 | 33 | 37 |

TABLE 2

| Control | Example | Comparative example | PVC, p.w. | Cl-PVC, p.w. | (A) Cl, percent of (A) | (B) MBS, p.w. | Kind of (B) | (C) EVA, p.w. | Vinyl acetate content of (C) (percent) | (B+C), p.w. | MBS, wt. percent in (B+C) | Delamination (hr.) | Thermal decomposition (number) | Softening point (°C.) | Impact strength (kg. cm./cm.²) | Heat fluidity (cm.) |
|---|---|---|---|---|---|---|---|---|---|---|---|---|---|---|---|---|
| 1 | | | 100 | | | | | | | | | | Impossible to mold | 75 | 2.0 | 21 |
| 2 | | | | 100 | 67 | | | | | | | Above 24 | Above 200 | 107 | 2.4 | 54 |
| | | 4 | | 100 | 67 | 1 | Reference Example A | 5 | 45 | 6 | 0 | 5 | Above 200 | 111 | 2.5 | 35 |
| | | 5 | | 100 | 67 | 2 | do | 3 | 33 | 8 | 0 | 4 | Above 200 | 107 | 3.9 | 34 |
| | | 6 | | 100 | 67 | 2 | do | 7 | 33 | 5 | 0 | 2 | Above 200 | 110 | 3.2 | 48 |
| | | 7 | | 100 | 67 | 7 | do | 5 | 28 | 9 | 0 | 3 | Above 200 | 107 | 3.4 | 39 |
| | | 8 | | 100 | 67 | 12 | do | 6 | 33 | 14 | 16.7 | 7 | Above 200 | 109 | 3.7 | 39 |
| | 1 | | | 100 | 67 | 5 | do | 3 | 33 | 4 | 25 | Above 24 | Above 200 | 109 | 3.3 | 46 |
| | 2 | | | 100 | 67 | 10 | do | 2 | 40 | 5 | 40 | Above 24 | Above 200 | 111 | 4.8 | 40 |
| | 3 | | | 100 | 67 | 78 | do | | | | | | | | | |
| | 4 | | | 100 | 67 | 86 | do | | | | | | | | | |
| | | 9 | | 100 | 67 | | do | | | 100 | 100 | Above 24 | 56 | 109 | 11.2 | 37 |
| | | 10 | | 100 | 67 | | do | | | 100 | 100 | Above 24 | 47 | 112 | 3.1 | 38 |
| | | 11 | | 100 | 67 | | do | 1 | 33 | 2 | 50 | Above 24 | 38 | 112 | 5.1 | 35 |
| | | 12 | | 100 | 67 | | do | | | | | | Impossible to mold | | | 27 |
| | 5 | | | 100 | 67 | 1 | do | 2 | 33 | 4 | 50 | Above 24 | Above 200 | 112 | 2.8 | 35 |
| | 6 | | | 100 | 67 | 15 | do | 4 | 33 | 19 | 79 | Above 24 | Above 200 | 107 | 13.3 | 42 |
| | | 13 | | 100 | 67 | 16 | do | 7 | 33 | 23 | 69.5 | 7 | Above 200 | 105 | 14.9 | 50 |
| | | 14 | | 100 | 67 | 5 | do | 5 | 60 | 10 | 50 | Above 24 | Above 200 | 104 | 3.8 | 32 |
| | 7 | | | 100 | 67 | 5 | do | 5 | 45 | 10 | 50 | Above 24 | 8 | 107 | 4.4 | 39 |
| | 8 | | | 100 | 67 | 5 | do | 5 | 28 | 10 | 50 | Above 24 | Above 200 | 108 | 5.7 | 41 |
| | | 15 | | 100 | 67 | 5 | do | 5 | 18 | 10 | 50 | Above 24 | 32 | 109 | 6.0 | 38 |
| | | 16 | | 100 | 67 | 2 | do | 0.5 | 33 | 2.5 | 80 | 2 | Impossible to mold | | | 26 |
| | 9 | | | 100 | 67 | 4 | do | 1.5 | 33 | 5.5 | 73 | Above 24 | Above 200 | 112 | 3.5 | 35 |
| | 10 | | | 100 | 67 | 6 | do | 6 | 33 | 12 | 50 | Above 24 | Above 200 | 106 | 10.8 | 49 |
| | | 17 | | 100 | 67 | 6 | do | 8 | 33 | 14 | 43 | 6 | Above 200 | 104 | 8.6 | 51 |
| | 11 | | | 100 | 67 | 5 | Reference Example B | 5 | 33 | 10 | 50 | Above 24 | Above 200 | 108 | 5.4 | 44 |
| | 12 | | | 100 | 67 | 5 | Reference Example C | 5 | 33 | 10 | 50 | Above 24 | Above 200 | 108 | 5.4 | 42 |
| | 13 | | | 100 | 69 | 5 | Reference Example A | 5 | 33 | 10 | 50 | Above 24 | Above 200 | 114 | 5.3 | 34 |
| | 14 | | | 100 | 65 | 5 | do | 5 | 33 | 10 | 50 | Above 24 | Above 200 | 104 | 5.4 | 56 |

NOTE.—p.w. shows parts by weight.

EXAMPLES 2-14, COMPARATIVE EXAMPLES 4-17 AND CONTROLS

Kinds and blending amounts of Cl-PVC, MBS and EVA were varied and operations were carried out exactly same as in Example 1 to mold and test results are shown in Table 2.

What is claimed:

1. Chlorinated polyvinyl chloride composition for molding consisting essentially of
    (A) 100 parts by weight of chlorinated polyvinyl chloride whose chlorine content is about 63% by weight,
    (B) a methyl methacrylate-butadiene-styrene graft copolymer obtained from a trunk polymer comprising 100 parts by weight of a butadiene-styrene copolymer containing at least 50% by weight of butadiene and as the graft component 50–200 parts by weight of a mixed monomer of methyl methacrylate and styrene containing 30–80% by weight of methyl methacrylate, and
    (C) 1–7 parts of an ethylene-vinyl acetate copolymer whose vinyl acetate content is 20–50% by weight
characterized in that total of said (B) and (C) is 3–20 parts by weight, and 20–80% by weight of total of said (B) and (C) is occupied by said (B) copolymer.

2. Chlorinated polyvinyl chloride composition for molding consisting essentially of
    (A) 100 parts by weight of chlorinated polyvinyl chloride whose chlorine content is 65–70% by weight,
    (B) a methyl methacrylate-butadiene-styrene graft copolymer obtained from a trunk polymer comprising 100 parts by weight of a butadiene-styrene copolymer containing at least 50% by weight of butadiene and as the graft component 50–200 parts by weight of a mixed monomer of methyl methacrylate and styrene containing 30–80% by weight of methyl methacrylate, and
    (C) 2–6 parts by weight of an ethylene-vinyl acetate copolymer whose vinyl acetate content is 25–45% by weight
characterized in that total of said (B) and (C) is 4–15 parts by weight and 25–75% by weight of total of said (B) and (C) is occupied by said (B) copolymer.

3. A composition described in claim 1 wherein the melt index of said ethylene-vinyl acetate copolymer is 2–200.

4. Molded articles of chlorinated polyvinyl chloride composition of claim 1.

References Cited

UNITED STATES PATENTS 2,943,074   6/1960   Feuer _____ 260—876

FOREIGN PATENTS 1,405,362   5/1965   France.

MURRAY TILLMAN, Primary Examiner

C. J. SECCURO, Assistant Examiner

U.S. Cl. X.R.

260—897, 899